United States Patent [19]

Müller et al.

[11] 4,349,948
[45] Sep. 21, 1982

[54] METHOD FOR MANUFACTURING METAL CASINGS FOR ACCESSORIES AND PARTICULARLY GATE VALVES

[75] Inventors: Erwin Müller, Herdecke; Bernd Kollmann, Witten; Ferdinand Sonnabend, Dortmund; Gert Petzolt, Nordkirchen; Josef Balz, Castrop-Rauxel; Bernhard Walloschek, Witten; Friedrich Risse, Bochum, all of Fed. Rep. of Germany

[73] Assignee: Thyssen Industrie AG, Fed. Rep. of Germany

[21] Appl. No.: 119,506

[22] Filed: Feb. 7, 1980

[30] Foreign Application Priority Data

Feb. 15, 1979 [DE] Fed. Rep. of Germany ....... 2905744

[51] Int. Cl.$^3$ ............................................. B23P 15/00
[52] U.S. Cl. ...................... 29/157.1 R; 72/293; 72/379; 72/122; 251/366
[58] Field of Search .................. 29/157.1 R; 251/366, 251/367, 359; 72/117, 122, 379, 293, 316, 422

[56] References Cited

U.S. PATENT DOCUMENTS

| | | | |
|---|---|---|---|
| 157,810 | 12/1874 | Garstang | 72/117 |
| 1,120,100 | 12/1914 | Sonneborn | 72/122 |
| 1,679,466 | 8/1928 | Cook | 72/117 |
| 1,999,599 | 4/1935 | Smith, Jr. | 29/156.7 A |
| 2,869,221 | 1/1959 | Siepmann | 251/366 |
| 3,224,729 | 12/1965 | Beurel | 251/367 |
| 3,511,474 | 5/1970 | Miner | 29/157.1 R |
| 4,057,022 | 11/1977 | Koshino et al. | 72/379 |

FOREIGN PATENT DOCUMENTS

| | | | |
|---|---|---|---|
| 891952 | 10/1953 | Fed. Rep. of Germany | 251/366 |
| 928861 | 6/1955 | Fed. Rep. of Germany | 29/157.1 R |
| 1310549 | 3/1973 | United Kingdom | 29/157.1 R |

*Primary Examiner*—Daniel C. Crane
*Attorney, Agent, or Firm*—McGlew and Tuttle

[57] ABSTRACT

A method of manufacturing metal casings, particularly gate valve casings, comprises, forming two casing shell half portions from a plate by holding the plate and forming a valve port in at least one of the plates with a forming tool, forming wall portions of the plate bounding the port into axially inwardly and axially outwardly extending collars bounding the opening and joining the two casing shell half portions together by a longitudinal weld which is accessible to ultrasonic and radiographic inspection to form a fluid- and pressure-tight casing. A device for carrying out the method comprises forming tools for imparting a shell, shaped to the plates and upper and lower dies which are provided with recesses for holding fast and forming or overforming flange-like collars. The collars may be formed with a forming tool having recesses for receiving displaced material forming the collars or a tool may be provided with upper and lower dies having working faces conformable to the shape of the respective casing part and capable of accommodating or receiving at least one forming tool, such as a roller or upsetting ram.

2 Claims, 16 Drawing Figures

METHOD FOR MANUFACTURING METAL CASINGS FOR ACCESSORIES AND PARTICULARLY GATE VALVES

FIELD AND BACKGROUND OF THE INVENTION

This invention relates to accessory casings in general and, in particular, to a new and useful valve casing and method of manufacturing said valve casing.

The manufacture of gate valve casings having large nominal widths, for example of 200 mm to 800 mm, by connecting two casing parts to each other by a longitudinal, fluid-tight weld is known. In this prior art design, each of the casing parts is provided with an outwardly projecting flange-like rim to which a pipe connection is welded. In the interior of the casing, a pipe connection is welded to each of the rimmed-out portions, with the two pipe connection ends facing each other, to which valve seat rings may be welded, forming guides and the valve seat for a shutoff member and, in the case under consideration, a gate.

Such a prior art gate valve casing has the disadvantage that the inside pipe connections providing the valve seat faces are secured by welds which cannot be inspected ultrasonically or radiographically. Such gate valve casings are, therefore, unusable in instances where particular safety regulations are to be met, for example, in nuclear power plants. In addition, gate valve casings manufactured in accordance with the prior art method, particularly large gate valves, may be very expensive. (See German Auslegungschrift Nos. 2,164,929; 1,425,710; 2,032,132 and 2,354,246; German Utility Model No. 7,031,192; German Pat. Nos. 1,928,585; 1,000,652; 755,989 and 973,519; German Offenlegungschrift Nos. 1,928,686; 2,057,746; 2,041,333 and 2,114,068; published Patent Application No. S, 28,115,X11/47 g, "Welding and Iron Materials" by Ludwig Zeyen and Wilhem Lohmann, Second Edition, 1948, published by Stahleisen mbH, Dusseldorft, page 297; "Progress in the Technology of Fittings, Particularly with Regard to Quality Inspection", by W. Kranert, 3R International, Volume 15, No. 9, September 1976, pages 530 to 535; and "Manual of the Welding Practice", Paul Schimpe and Hans A. Horn, Third Edition, Springer Publishers, 1943, Berlin, pages 173/180.)

SUMMARY OF THE INVENTION

The present invention is directed to a method of the above-mentioned kind which eliminates the disadvantages of the prior art methods and avoids inside welds, while permitting simple manufacture and ultrasonic and radiographic inspections.

The invention is further directed to a device for carrying out the method, primarily for manufacturing gate-valve casings, which is simple in construction and makes it possible to manufacture even gate valve casings of very large nominal widths. The casing parts to be assembled to a casing, preferably for gate valves, may be manufactured, in accordance with the invention, in a variety of advantageous ways.

A flat plate blank may be provided with a bored- or burned-through hole of a relatively small diameter. In one variant of the method, the wall portions of this hole or bore are then deformed by suitable tools, particularly rollers, so as to produce flange-like collars which extend in opposite directions perpendicularly to the surface of the blank. Thereupon, the blank with the hole bordered by rimmed-out collars and enlarged to the diameter of the pipe connection to be later welded on from the outside, is placed into suitable forming tools, particularly into a press, where the still flat portions of the blank are worked to the shape of the casing part.

In order to prevent the collars formed thereon from distorting or other damage, particularly in an upsetting operation, upper and lower dies are applied to both sides of the blank prior to working it to shape, with the dies supporting and holding the collars and the surface portions in that area, preferably all around. This may be followed by a further forming and/or overforming of portions of the collars. It is possible, for example, to further form or overform the free end of the collar ridge facing the interior of the casing as desired, for example, to press this collar crest flat, so that a suitable lining or valve seat part may later be applied thereto.

The finish-formed casing parts are then removed from the forming tools. In addition, it may only be necessary to descale the collars. To this end, it may be sufficient in some cases to slightly finish, for example, to overgrind, the collar portions which will face the shutoff member.

A variation of the inventive method starts from a flat blank with a through-hole of relatively small diameter and forming the blank, in a suitable tool, particularly a press, immediately to the shape of the casing part.

The flange-like collars are formed either within the casing-forming tool, for example, in an upsetting or rolling operation, or the upsetting or rolling of the collars is performed subsequently, outside of the tool in which the casings have been formed. It is also possible, however, to press the blanks to casing parts and to make the holes at the same time, and to form the flange-like collars, for example, by rolling or upsetting, simultaneously with, or with some delay after, the shaping of the casing part.

It is further possible to place the finished and previously holed casing parts in another tool, to fix them, and then to provide them with the flange-like collars by means of another tool, particularly in an upsetting or rolling operation.

A particular advantage of the inventive method is that inside welds are avoided. A pipe connection is welded only to the formed collar projecting to the outside. At the same time, the dimensions of the upset portion can easily be predetermined to the effect that the weld will be sufficiently spaced from the outer surface of the casing thus permitting, for example, the application of a film in order to test the weld through radioscopic inspection. It is possible, in addition, to subject the weld of the pipe connections to an ultrasonic test, so that the casings manufactured in accordance with the invention can be used even in plants where special safety regulations must be observed, such as in nuclear power plants.

The inventive device or apparatus is of a rugged construction and comprises relatively few component parts permitting manufacture of valves up to very large gate valves having a nominal width, for example, of from 200 mm to 800 mm, and preferably, from 250 mm to 600 mm.

Accordingly, it is an object of the present invention to provide a method of manufacturing metal casings, particularly gate valve casings, which comprises forming two casing shell half parts from a plate, and forming at least one of the plates with a valve port by holding the plate forming it with a forming tool, and forming the wall portions of the plate bounding the port into axially inwardly and axially outwardly extending collars, and then subsequently joining the two shell half parts together by a longitudinal weld.

A further object of the invention is to provide an apparatus for forming gate valve casings in which a plate is held while a port is formed therein and then subsequently an outwardly and inwardly extending tubular collar is formed around the opening and the plate is joined with a similarly formed plate by a longitudinal weld into a casing.

Another object of the present invention is to provide apparatus for manufacturing metal casings for gate valves which is simple in design, rugged in construction and economical to manufacture.

DESCRIPTION OF THE PREFERRED EMBODIMENTS

Figure 1:
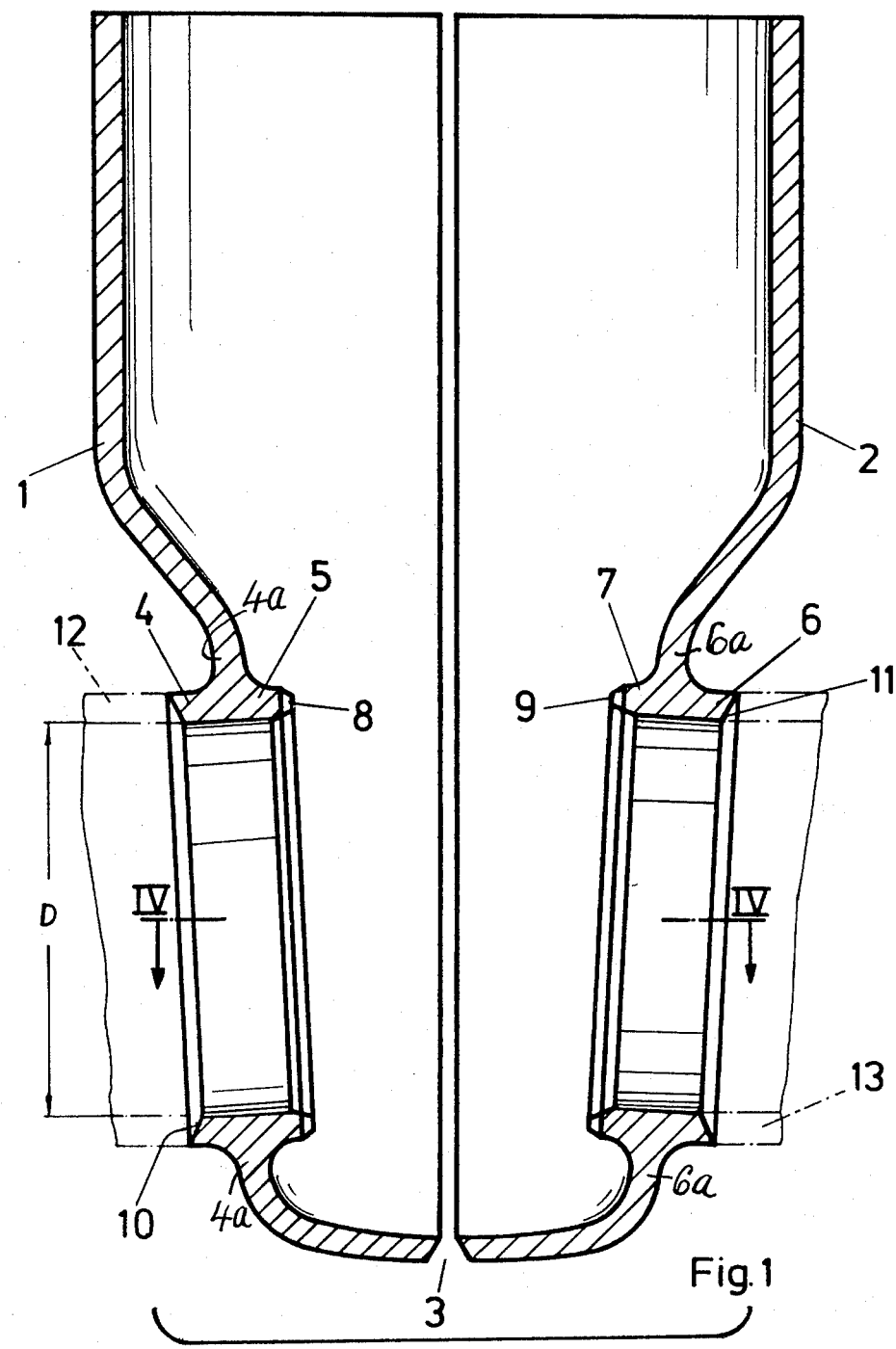
FIG. 1 is a longitudinal view of two spaced apart casing parts which have not been welded together and which are employed in the method of the invention.

The invention is illustrated as applied to the manufacture of a large gate valve casing to be used under particular security measures, for example, in nuclear power plants. Referring to the drawings in particular, the invention embodied therein in FIGS. 1 to 4 show two casing parts 1 and 2 which are to be welded together by a fluid- and pressure-tight longitudinal weld. The weld is applied at 3 and it is accessible to both ultrasonic and radiographic inspection, since a sufficiently large approach space is available even for an ultrasonic inspectroscope (not shown), so that there is no risk of invalidating the measuring results.

Each casing part 1 and 2 is formed with flange-like outer and inner tubular collars 4 and 5 and 6 and 7 which are integral with the casing part and extend to both the outside and to the inside. Collars 4 and 5 and 6 and 7 may be coaxial with each other and, in the embodiment shown, they have identical inside diameters D. In the embodiment of FIG. 1, the longitudinal axes of collars 4 and 5 and 6 and 7 intersect at an obtuse angle because each of the longitudinal axes, for example, forms an angle of about 3% with the horizontal.

The flange-like collars 5 and 7 which project into the interior are each provided on their free end portions facing the interior with a low-wear lining 8, 9 formed by a welded builtup surface, which cooperates in a sealing manner with a shutoff gate (not shown), for example, a spindle with a hand wheel. Valve seat rings may also be welded thereto or these free end portions of collars 5 and 7 may themselves be shaped into a valve seat.

Collars 4 and 6 are each provided on their sides remote from the interior with a respective bevel 10, 11, to which an indicated pipe connection 12, 13 is to be welded in a fluid- and pressure-tight manner. The welds tightly connecting the pipe connections 12, 13 to collars 4, 6 are also fully accessible to both ultrasonic and radiographic inspection. A sufficient space at 4a and 6a is available for approaching and ultrasonic inspectoscope, because each of the welds is sufficiently spaced from the casing wall due to the provided collar 4 or 6, so that no distorted results of measurement can be obtained.

In the following, the manufacture of a casing, particularly for a gate valve, such as shown in FIGS. 1 to 4, is explained in more detail with regard to some variations of the method.

Figure 2:
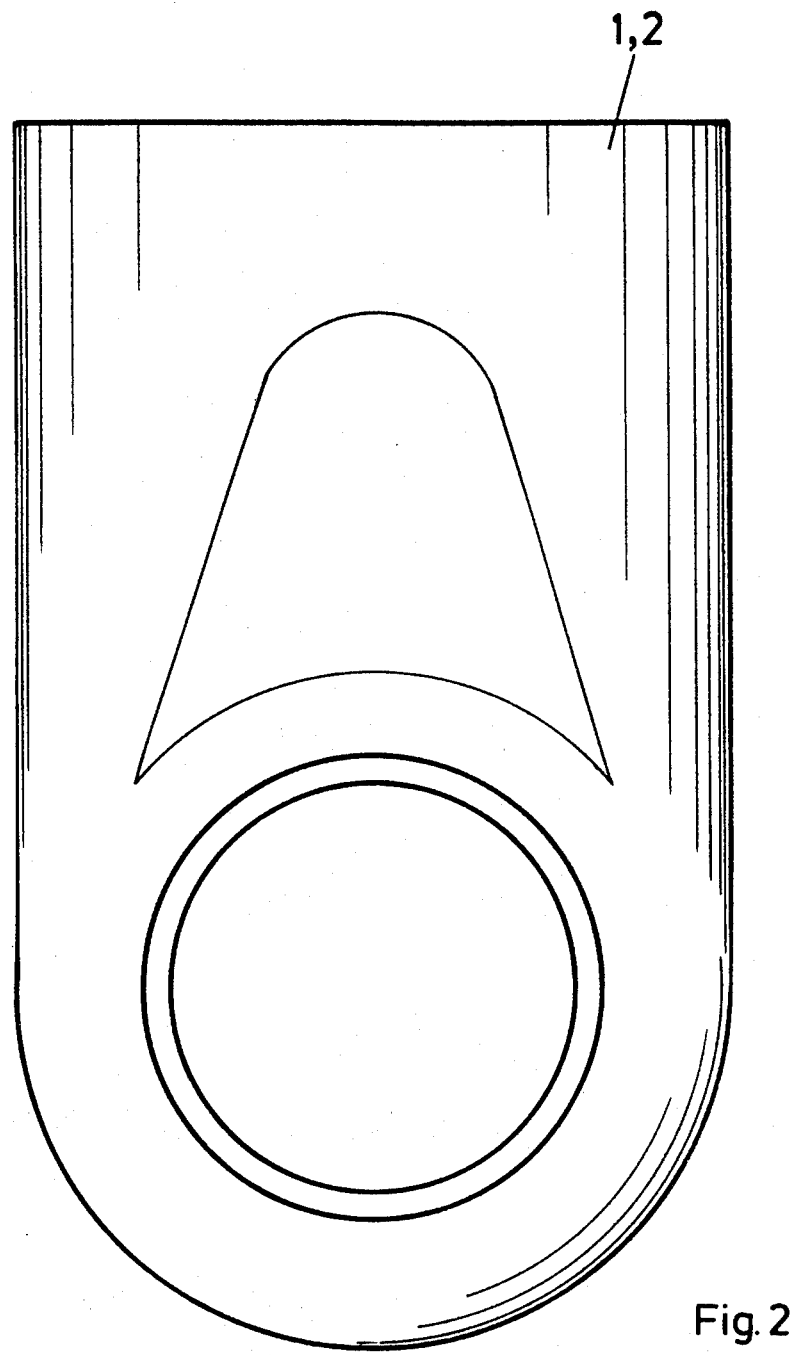
FIG. 2 is a side elevation of the casing shown in FIG. 1.
Figure 3:
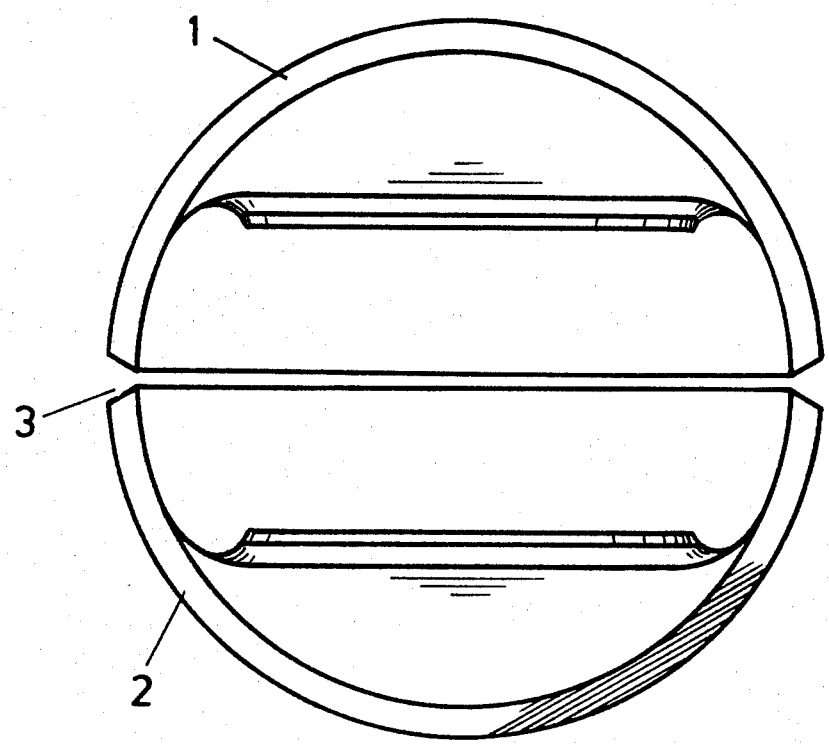
FIG. 3 is a top plan view of the part shown in FIG. 1.
Figure 4:
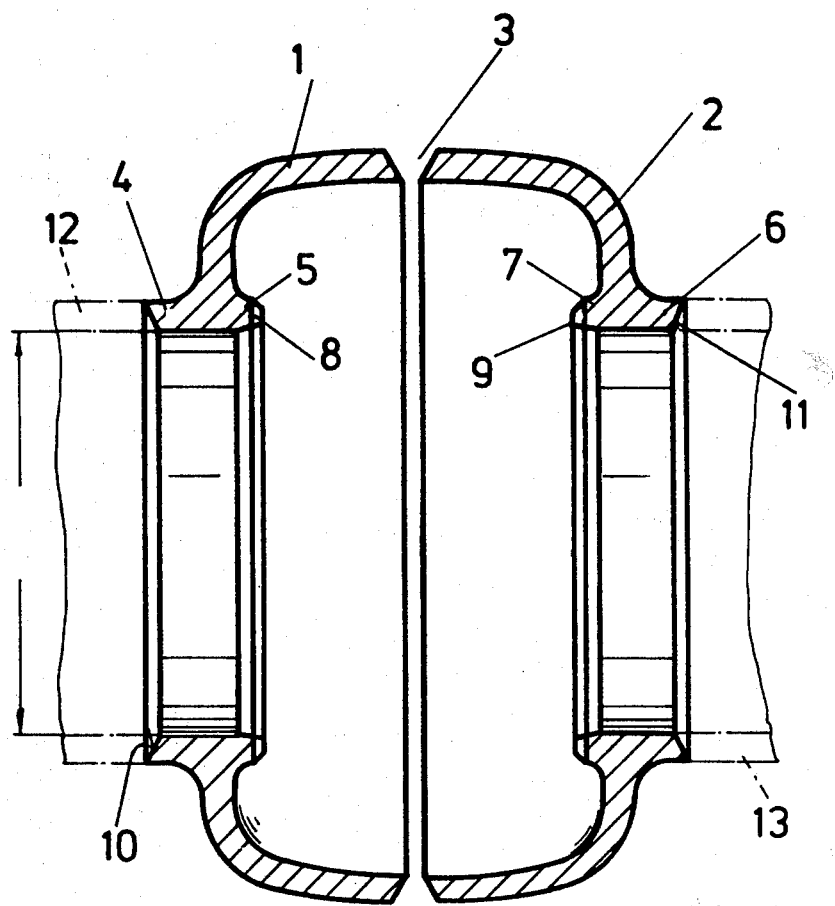
FIG. 4 is a sectional view taken along the line IV—IV of FIG. 1, with the pipe connections not yet being welded together and being indicated in dash-dotted lines.

Referring first to FIGS. 5 to 12, and starting from a flat plate blank 14, in which a hole 15 has been bored or burned, having a diameter $d_1$ which is smaller than the inside diameter of a pipe connection 12, 13 (FIG. 1), hole 15 is then enlarged or upset by means of suitable forming tools 16, particularly rollers, until the inside diameter D of the pipe connections, or the inside diameter D of collars 4,5 or 6,7, shown in FIGS. 1 and 2, is attained.

The blank 14, which is thus preshaped, is placed in a forming tool comprising an upper and a lower die 17, 18 (see FIG. 9) which have opposite contours corresponding to the contrours of a finished casing part 1, 2, as shown in FIG. 1. Before the upper and lower dies 17 and 18 are moved into their positions shown in FIG. 10, thus prior to giving blank 14 the shape of a casing part 1 or 2, the flange-like collars 4 and 5 or 6 and 7 are engaged by another forming tool which also comprises an upper and lower die 19, 20, and is held fast therebetween.

Figure 10:
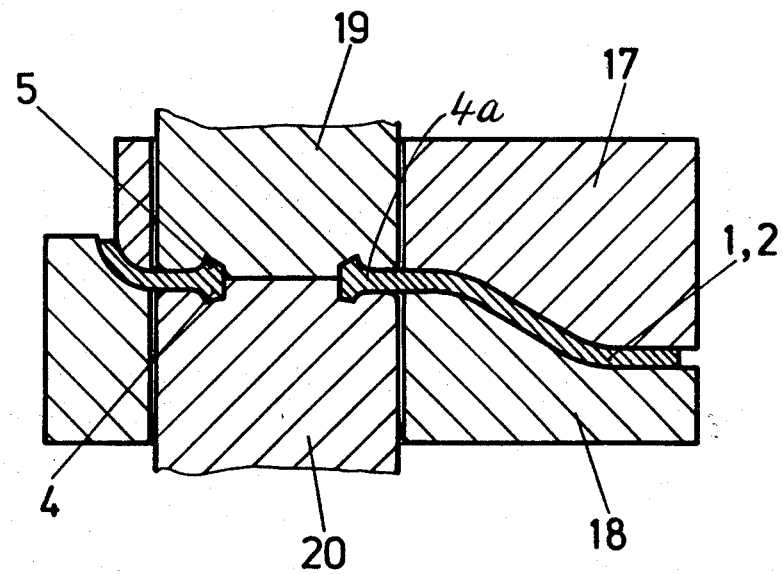

In this variation of the invention, the entire surface area 4a, 6a outside and inside flange-like collars 5,4 or 6,7 is held fast and supported in upper and lower first dies 19 and 20 so that, during the following motion of upper and lower second dies 17 and 18 toward each other into their positions shown in FIG. 10, collars 4,5 or 6,7 cannot warp or otherwise deform.

Dies 17 and 18 are then moved apart again and the respective casing part 1 or 2 is removed therefrom and is ready to be welded to an identical other casing part to a complete casing, particularly for a gate valve. If necessary, bevels for valves may be produced or finished, in particular, descaled. It is also possible to overform the inner collar 5, 7 during the head-on motion of tools, 19, 20, for example, by pressing it flat prior to applying the respective lining 8, 9 or affixing a valve seat ring.

Figure 11:
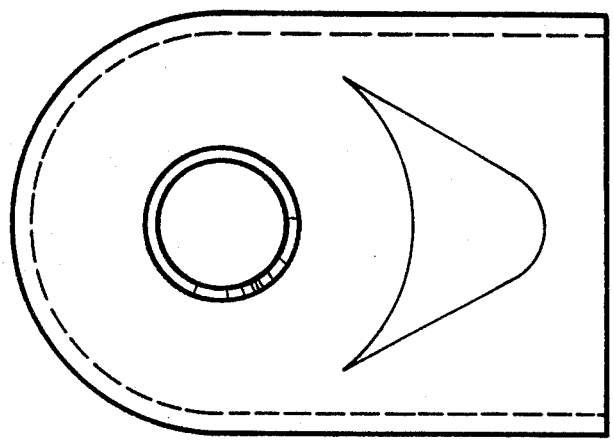
Figure 12:
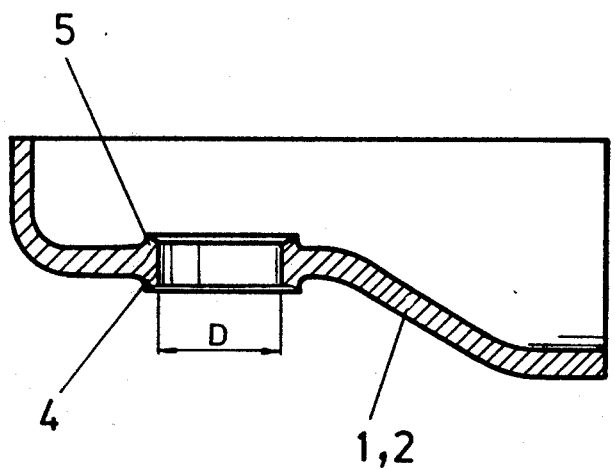

FIGS. 11 and 12 show finished casing parts in elevation and section, respectively.

Figure 5:
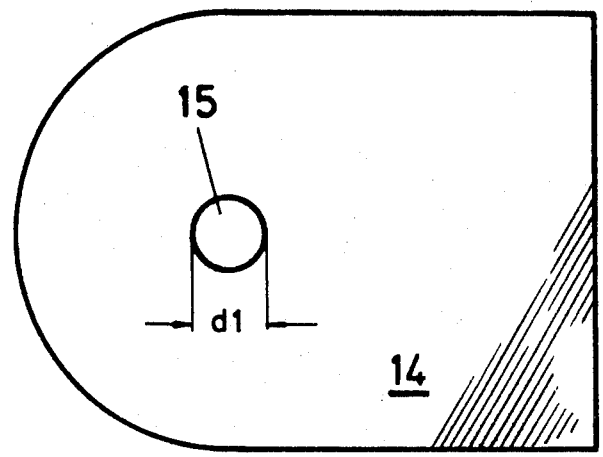
FIGS. 5 through 16 show schematic views of the individual steps of the manufacturing process for different embodiments of the invention.
Figure 6:
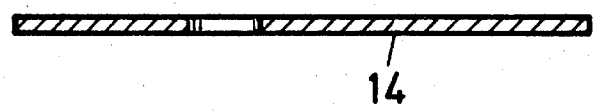
Figure 7:
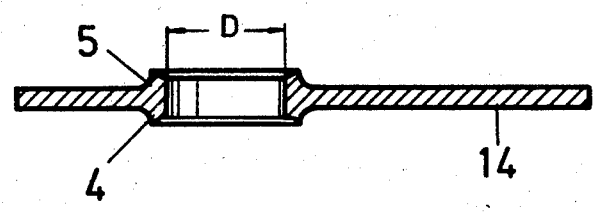
Figure 8:
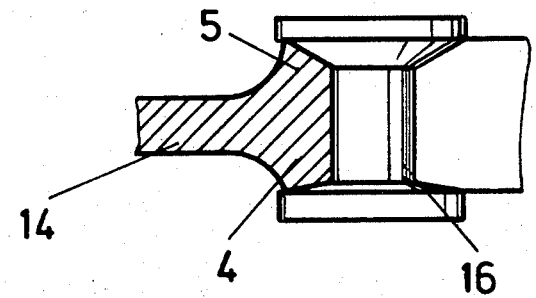
Figure 9:
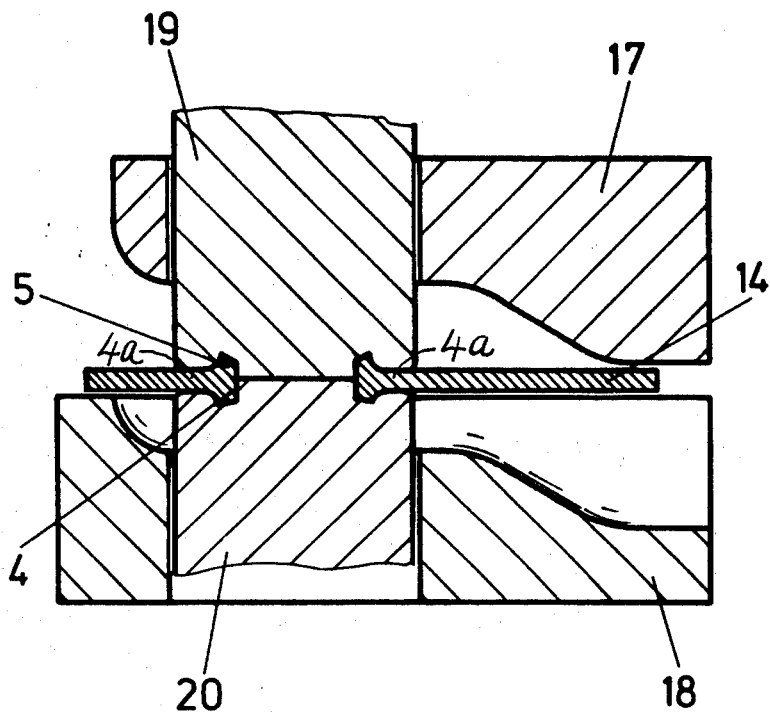
Figure 13:
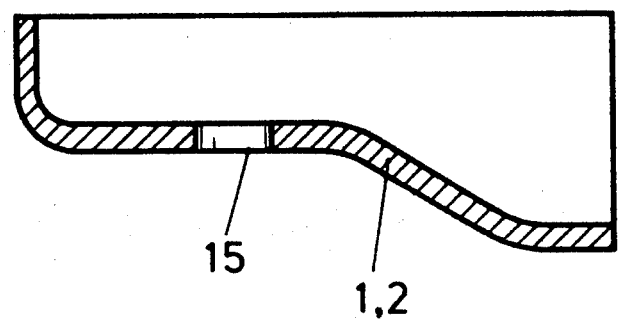
Figure 14:
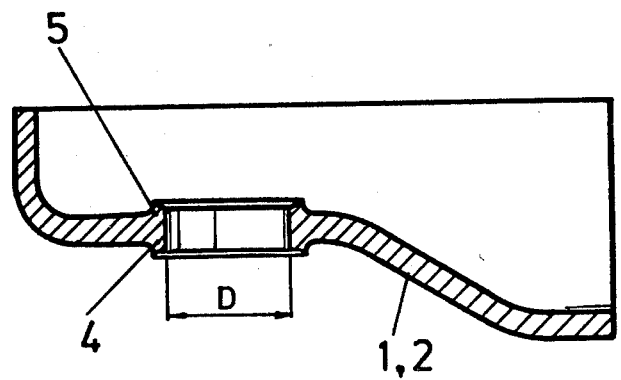

According to FIG. 13, the manufacture can also start from a flat plate blank 14, such as shown in FIG. 5. The hole or port 15 is then rimmed-out to produce a flange-like collar 4, 5 or 6, 7 (FIGS. 1 and 2). As in the variant of FIGS. 5 to 12, a rolling or upsetting operation may serve this purpose and may be performed outside the press die proper (FIG. 9), or within the die itself, which is explained hereinafter.

It is also possible to manufacture the casing part 1 or 2 from a flat plate or sheet blank 14, according to FIG. 13, and to provide it with a hole. The collars 4,5 or 6,7 are then formed on the finished casing part 1 or 2 by upsetting, by means of a forming tool comprising an upper die 21 and lower die 22 and an abutment 23, and a welding bevel for the pipe connection, such as shown at 10, is produced at the same time.

Figure 15:
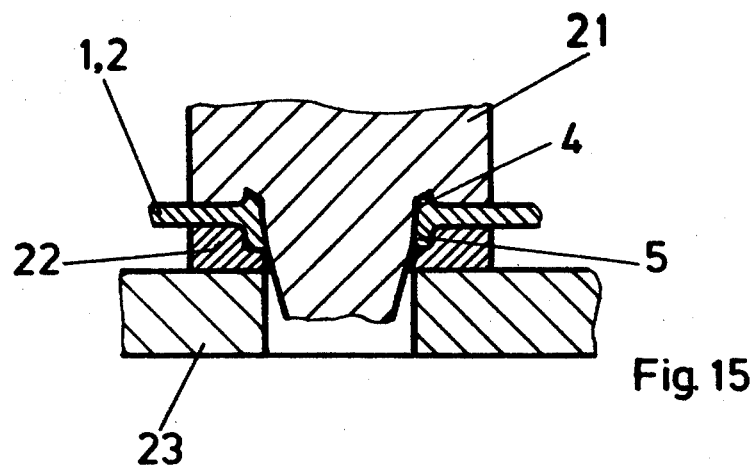

According to FIG. 15, it is further possible to produce the collars 4, 5 or 6, 7 in an upsetting operation and by means of the forming tool, on the still flat blank 14 which has not yet been formed to the shape of a casing part 1, 2.

Figure 16:
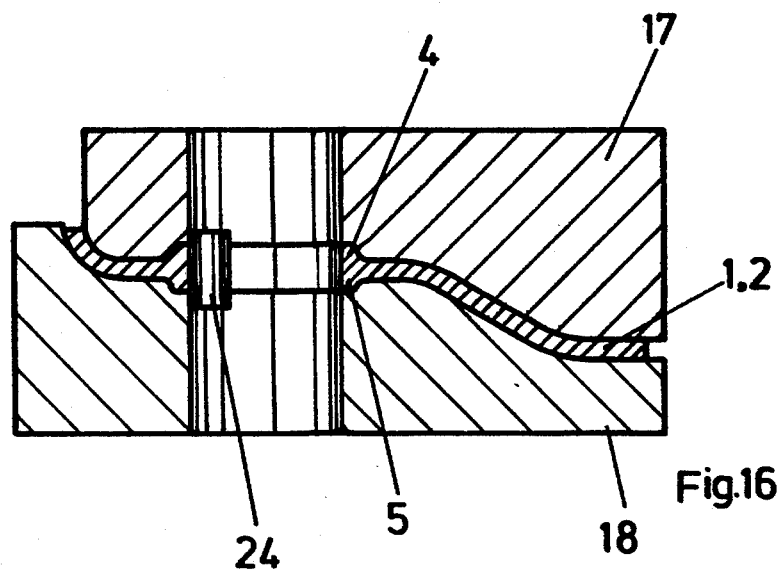

In the variant of FIG. 16, the collars 4 and 5 or 6 and 7 are produced within forming tools 17 and 18, thus after blank 14 has been formed to a casing part. For this purpose, rollers 24 are provided in the example shown.

While specific embodiments of the invention have been shown in detail to illustrate the application of the principles of the invention, it will be understood that the invention may be embodied otherwise without departing from such principles.

What is claimed is:

1. A method of manufacturing a metal gate valve casing having a large nominal width over 200 mm and welded pipe connections to collars having a selected inside diameter on opposite sides of the said casing, comprising:

forming a bore of a diameter less than said selected diameter in each of two flat plates;

forming, in each bore of each flat plate, inwardly and outwardly extending tubular collars having said selected inside diameter, using a metal deforming tool;

holding and bracing said deformed inwardly and outwardly extending collars the surface of said selected inside diameter and a surrounding surface of each plate in the vicinity of each collar using upper and lower first die elements which expose a remainder of each plate;

forming said remainder of each plate into a three-dimensional curved part using upper and lower second die elements while maintaining said collars and surrounding surface in said upper and lower first die elements; and joining said curved parts together by a longitudinal weld extending between said curved parts to form said valve casing.

2. A method according to claim 1, including welding on each inwardly extending tubular collar a low-wear lining.

* * * * *